United States Patent
Welp et al.

(10) Patent No.: US 7,396,091 B2
(45) Date of Patent: Jul. 8, 2008

(54) CATERPILLAR BAND CHAIN FOR TRACKED VEHICLES

(75) Inventors: Alexandra Welp, Bochum (DE); Kurt Schlupp, Solingen (DE); Klaus Spies, Remscheid (DE)

(73) Assignee: Diehl Remscheid GmbH & Co. KG, Remscheid (DE)

( * ) Notice: Subject to any disclaimer, the term of this patent is extended or adjusted under 35 U.S.C. 154(b) by 0 days.

(21) Appl. No.: 11/294,028

(22) Filed: Dec. 5, 2005

(65) Prior Publication Data

US 2007/0018500 A1    Jan. 25, 2007

Related U.S. Application Data

(63) Continuation of application No. PCT/EP2004/005982, filed on Jun. 3, 2004.

(51) Int. Cl.
B62D 55/205    (2006.01)

(52) U.S. Cl. .................................. 305/158; 305/202

(58) Field of Classification Search ................ 305/158, 305/160–164, 40–43, 202–204
See application file for complete search history.

(56) References Cited

U.S. PATENT DOCUMENTS

| | | | | |
|---|---|---|---|---|
| 1,548,050 | A | * | 8/1925 | Lord .............................. 301/42 |
| 1,949,423 | A | * | 3/1934 | Knox et al. .................. 305/164 |
| 1,966,450 | A | * | 7/1934 | Knox .......................... 305/160 |
| 2,350,444 | A | | 6/1944 | Burgess |
| 2,390,905 | A | | 12/1945 | Wening et al. |
| 2,402,042 | A | * | 6/1946 | Haushalter .................. 305/158 |
| 2,719,759 | A | * | 10/1955 | Waller ........................ 305/164 |
| 4,840,438 | A | * | 6/1989 | Cory ........................... 305/160 |
| 4,892,365 | A | * | 1/1990 | Szakacs ....................... 305/59 |
| 5,058,963 | A | * | 10/1991 | Wiesner et al. ............. 305/158 |
| 6,076,901 | A | * | 6/2000 | Rankin et al. ............... 305/160 |

FOREIGN PATENT DOCUMENTS

EP    0 410 216 A    12/1990

* cited by examiner

*Primary Examiner*—Jason R Bellinger
(74) *Attorney, Agent, or Firm*—Scully, Scott, Murphy & Presser, P.C.

(57) ABSTRACT

A caterpillar band chain (1) has an attachment or hinge area (3, 4) including connectors (10) which are situated on the outside. The connectors (10) clamp bolts (20, 21) in a rotationally fixed manner. The bolts (20, 21) are mounted in rubber mountings (18) in tubes (6, 7).

4 Claims, 3 Drawing Sheets

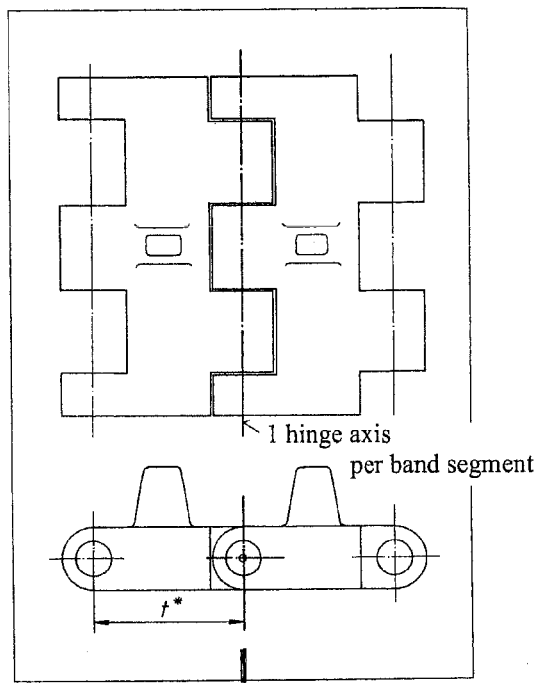
EXHIBIT A
Hinge Chain Principle (Wiesner)
U.S. PATENT # 5,058,963
1 hinge axis per band segment
Fig.2
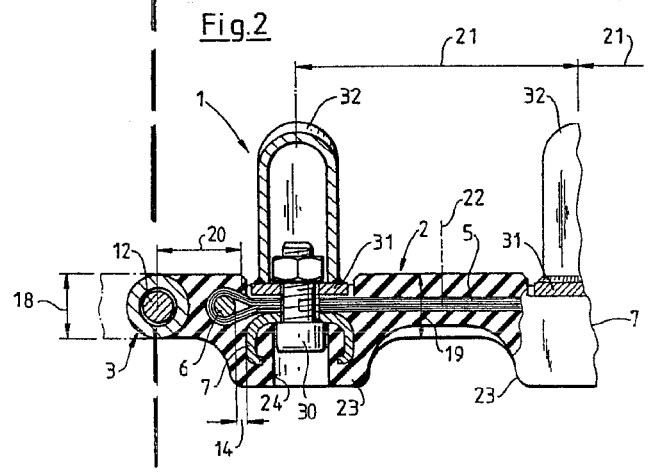
Fig.3
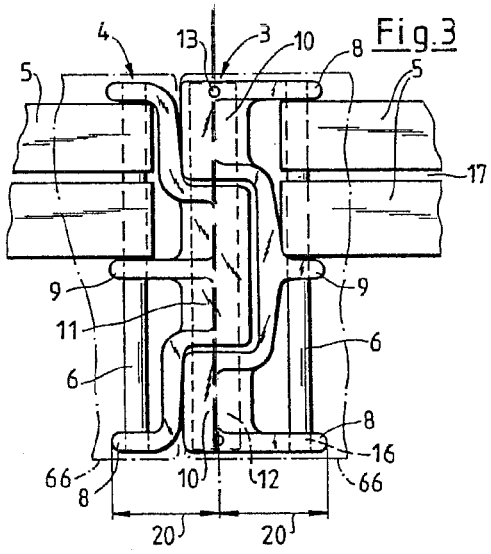

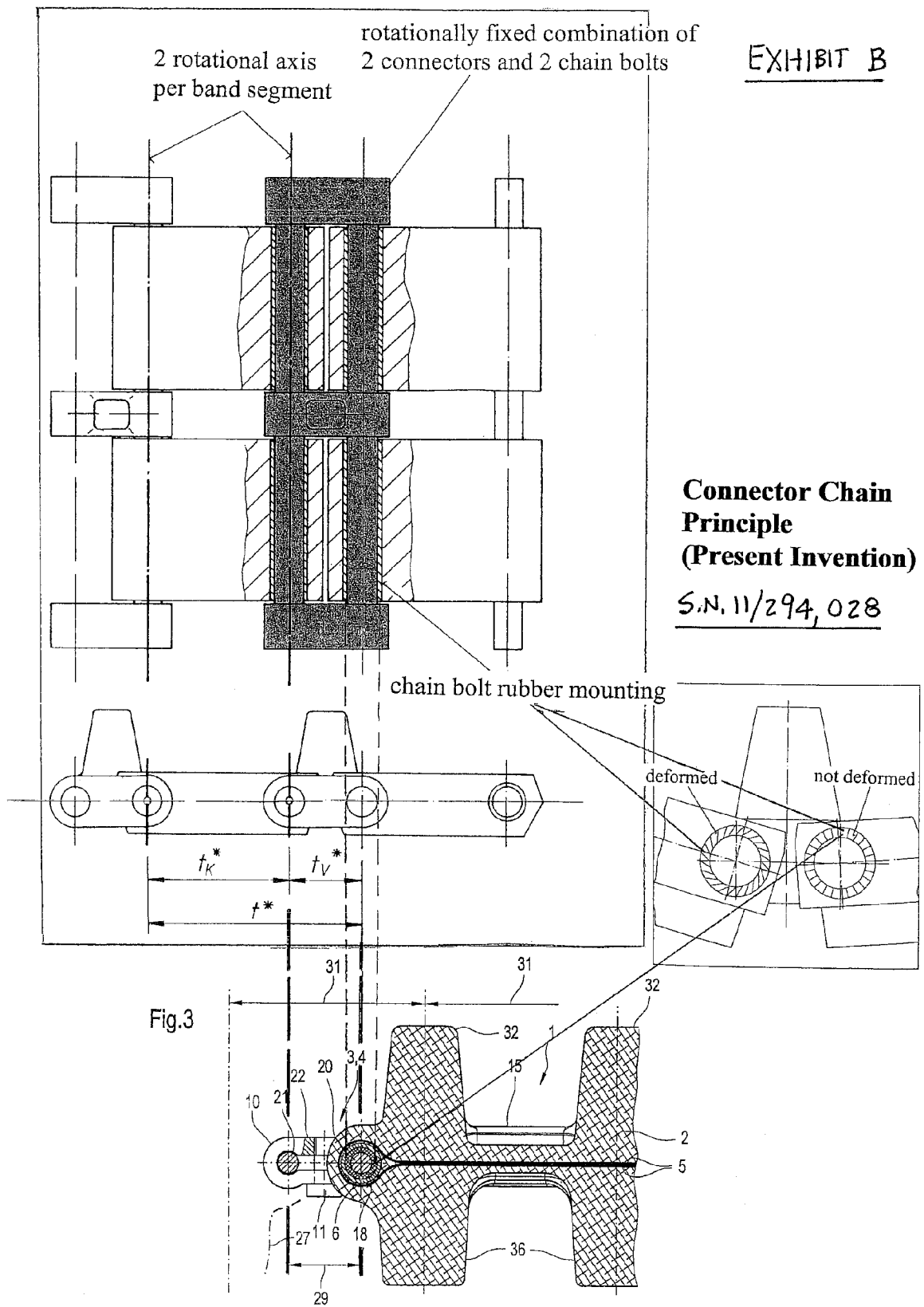

CATERPILLAR BAND CHAIN FOR TRACKED VEHICLES

CROSS-REFERENCE TO RELATED APPLICATION

This application is a continuation application of PCT/EP2004/005982, filed Jun. 3, 2004.

BACKGROUND OF THE INVENTION

1. Field of the Invention

The invention relates to a caterpillar or track-laying band chain for tracked vehicles and snowmobiles, which comprises individual and readily exchangeable band segments.

2. Discussion of the Prior Art

A rubber block chain is known from U.S. Pat. No. 1,966,450. The length of the rubber block is slightly less than the chain pitch. Screwed connectors are provided on the outside for connecting the rubber blocks. The connectors clamp hollow bolts in a rotationally fixed manner. These hollow bolts are vulcanized in the rubber block.

A caterpillar or track-laying band chain is also known from European Patent Application No. 0 410 216, in which band sections are connected using steel articulating elements. The articulating elements are themselves connected to one another using a steel bolt. The disadvantage of this arrangement is that the driving behavior of the vehicle is adversely affected by excessive imbalances on account of the articulated closing points.

SUMMARY OF THE INVENTION

It is therefore an object of the invention to propose attachment or hinge areas for a caterpillar or track-laying band chain with band segments, in which the attachment areas are designed to be as light as possible.

The invention achieves this object in accordance with the features as described herein.

The invention advantageously ensures that the expansion of the attachment areas in the direction of the band is very small and flexible on account of the rubber-mounted chain bolts. The chain can be easily mounted on or removed from the vehicle on account of the connectors. It is unnecessary to raise the vehicle. The band chain is, as is customary with link chains, laid out on the ground and connected at the attachment area or areas once the vehicle has been driven on to the laid-out chain. The removal of the separable chain takes place in the reverse order.

There are further advantages in that the complexity in the mounting and removal of the chain on/from the vehicle is very low with low expenditure of personnel. The danger of accidents when mounting the band chain on the vehicle is reduced because the vehicle does not need to be raised. Lastly, the storage and transport space is low because of the possibility of the band chain, which has an attachment or hinge area or areas, being rolled up. In the case of band chains with a plurality of attachment areas, individual band segments can be exchanged directly on the vehicle in the event of damage.

BRIEF DESCRIPTION OF THE DRAWINGS

An exemplary embodiment is illustrated in the drawings, in which.

DETAILED DESCRIPTION OF THE INVENTION

Figure 1:
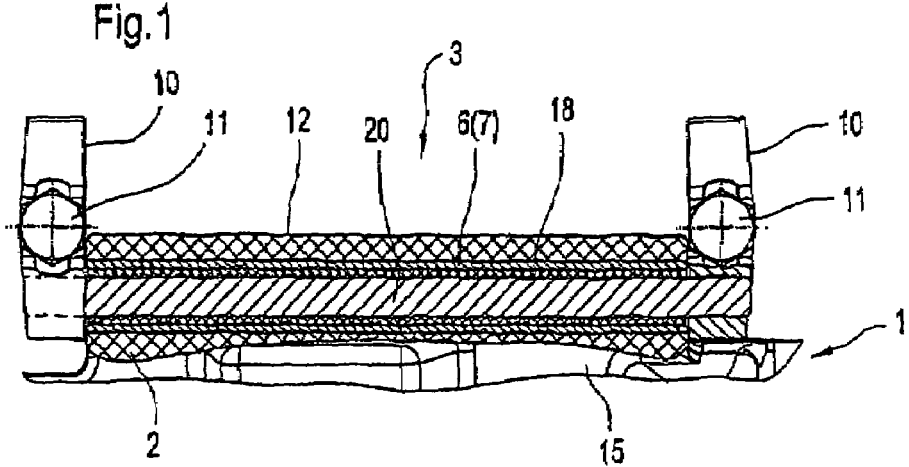
FIG. 1 shows an enlarged sectional view of a closing point according to a detail I, as encircled in FIG. 2.

According to FIG. 1, an attachment area 3, 4 of a caterpillar band chain 1 comprises two connectors 10 having screws 11, a tube 6 which is vulcanized in the basic body 12, a pre-stressed rubber mounting 18 and a bolt 20 which is pressed into the rubber mounting 18.

Figure 2:
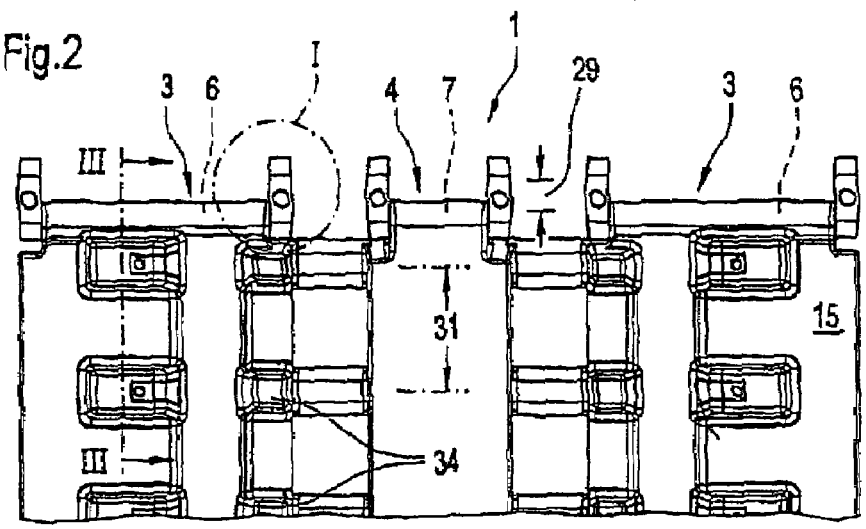
FIG. 2 shows a caterpillar or track-laying band chain having a closing point.

The attachment areas 3, 4 corresponding to FIG. 2 are, in principle, of identical design corresponding to the design according to FIG. 1.

Figure 3:
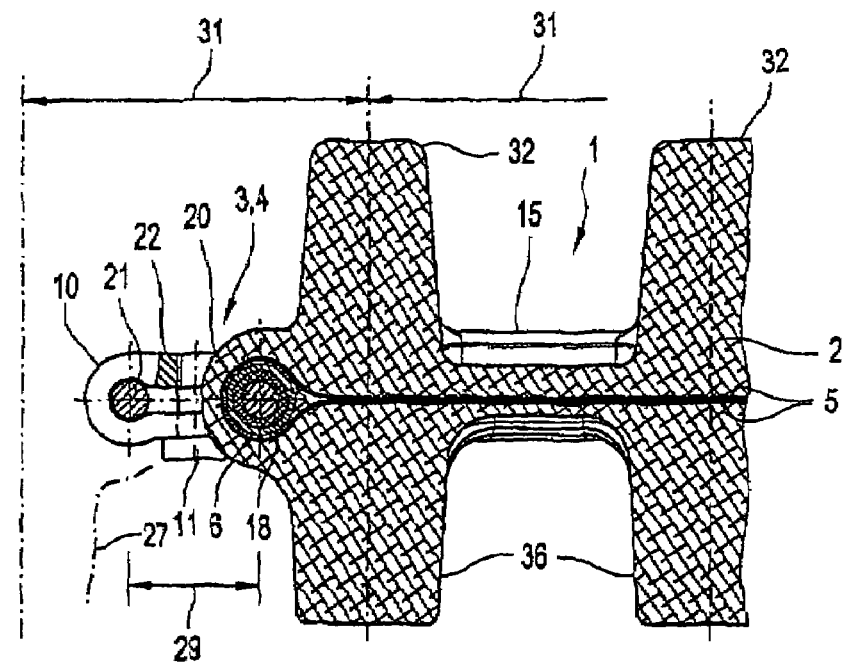
FIG. 3 shows, on an enlarged scale, a section taken along line III-III in FIG. 2.

According to FIG. 3, the connector 10 clamps the two bolts 20, 21 of two band segments 15, 27 by means of the screw 11 with the thread 22. The bolts 20, 21 are provided as round bolts that is with a full circular cross section, so that there is no danger of a notch fracture due to flattenings or holes.

The attachment area 3, 4, which is defined by the bolts 20, 21 and the connector 10, has a pitch 29. This is ⅓ of the band segment pitch 31, which is defined by the distance between the guide teeth 32 and the distance between the driving lugs 34 which are flush with them.

The caterpillar or track-laying band chain has running lugs 36 vulcanized on the ground-facing side.

What is claimed is:

1. A caterpillar or track-laying band chain (1) for tracked vehicles and snowmobiles, comprising two individual, exchangeable band segments (15), in which each said band segment (15) has a rubber basic body (2), including inserts (5) which are vulcanized in said basic body and are loadable under tension, said inserts (5) being each wrapped around a respective tie-rod (6) which is fastened transversely in the basic body (2) in the region of attachment areas (3, 4) of the band segments (15), connectors (10) which connect the tie-rods (6) of said two band segments (15, 27) to one another, each of said tie-rods comprising a tube (6), each said tube (6) including a rubber-mounted bolt (20, 21), the bolts (20, 21) being rotationally fixed by said connectors (10), the attachment areas (3, 4) each consisting of two said tubes (6), including rubber mountings (18) for said bolts, the bolts (20) and the connectors (10) lying within one chain pitch (31) and being of a flexible construction produced by the rubber mountings (18).

2. The caterpillar band chain as claimed in claim 1, wherein the pitch (29) of the attachment areas (3, 4) is approximately 30% of the pitch (31) of each said band segment (15, 27).

3. The caterpillar band chain as claimed in claim 1, wherein said tubes (6) each consist of steel, at least one said tube (6) is vulcanized at the attachment area (3, 4) on each said band segment (15, 27).

4. The caterpillar band chain as claimed in claim 3, wherein said steel tubes (6, 7) are vulcanized at the respective attachment areas (3, 4).

* * * * *